United States Patent Office 3,074,962
Patented Jan. 22, 1963

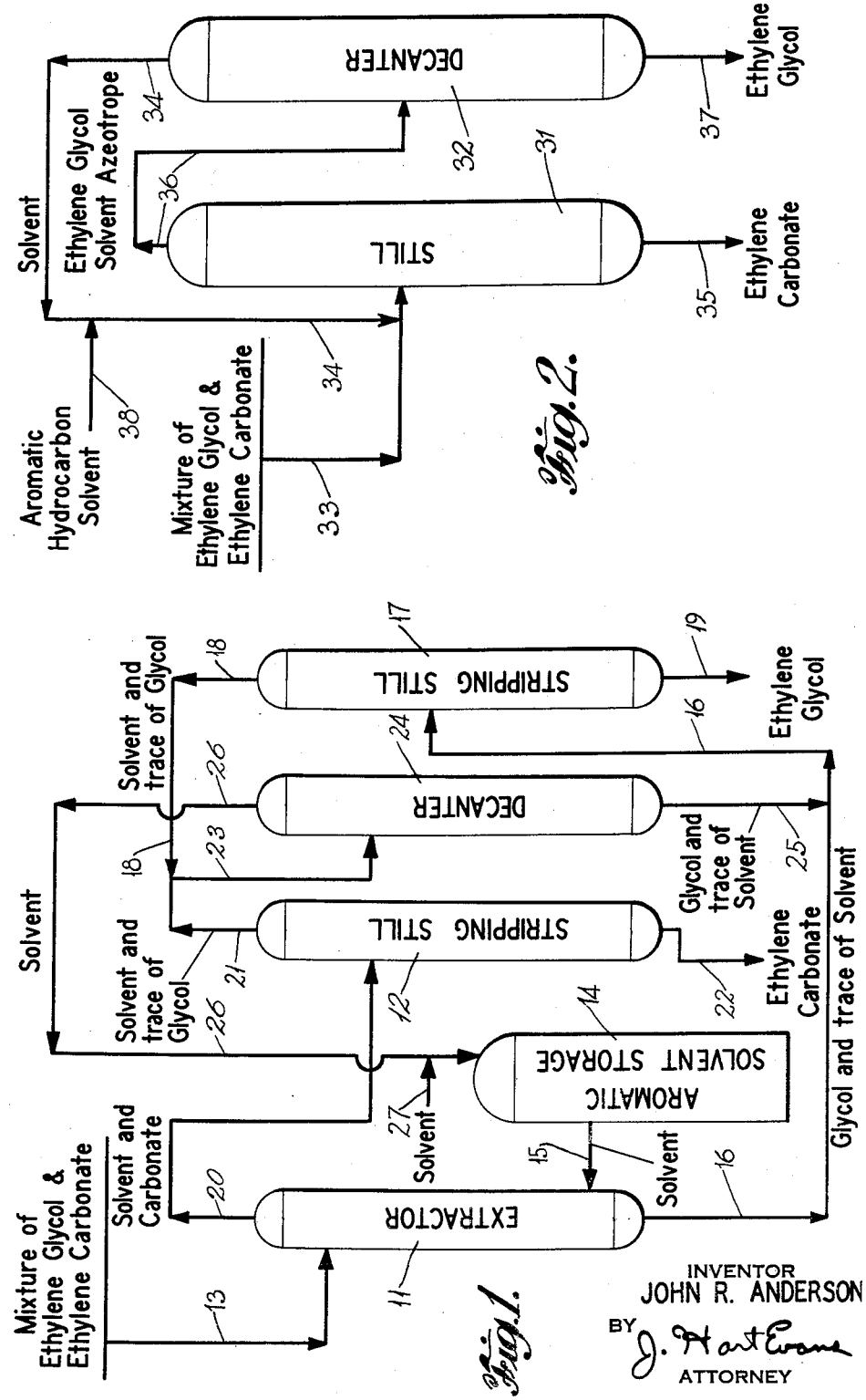

3,074,962
SEPARATION OF ETHYLENE CARBONATE FROM ADMIXTURE WITH ETHYLENE GLYCOL
John R. Anderson, Pittsburgh, Pa., assignor to Union Carbide Corporation, a corporation of New York
Filed Apr. 22, 1958, Ser. No. 730,217
14 Claims. (Cl. 260—340.2)

This invention relates to chemical processes. More particularly, it is directed to a method for separating ethylene carbonate from admixture with ethylene glycol.

Mixtures of ethylene carbonate with ethylene glycol are encountered in a number of different situations. Recently both ethylene glycol and ethylene carbonate have found increasing use as selective solvents, and it has been suggested to use a mixture of the two for some applications. Use of such a mixture may require eventual separation in reclaiming the ethylene glycol and ethylene carbonate after their use as a mixed solvent. Even when ethylene glycol is not deliberately mixed with ethylene carbonate, as just described, an undesirable contamination of ethylene carbonate with unwanted ethylene glycol is also frequently encountered due to the nature of ethylene carbonate.

One method for the production of ethylene glycol is by the reaction of ethylene oxide with water. The major process for the production of ethylene carbonate is by the reaction of ethylene oxide with carbon dioxide. As would be expected, therefore, if any water is present in either the ethylene oxide or the carbon dioxide used in making ethylene carbonate, it is likely that some ethylene glycol will also be formed and thus contaminate the ethylene carbonate product. Similarly, if water is present during the refining of ethylene carbonate or during any chemical operations with ethylene carbonate, or even during storage of ethylene carbonate, some hydrolysis of the ethylene carbonate to ethylene glycol can be expected.

Thus, the separation of ethylene carbonate and ethylene glycol is a matter of commercial importance. It may be accomplished by fractional distillation, but the instability of ethylene carbonate, especially in the presence of impurities, at its boiling point makes distillation a tedious and not entirely satisfactory procedure. It is, of course, possible to convert all the ethylene carbonate to ethylene glycol, and this might be desirable for purifying ethylene glycol that is contaminated with a small proportion of ethylene carbonate. But ethylene carbonate is more valuable than ethylene glycol, so that where appreciable proportions of ethylene carbonate are present, it is desirable to separate the ethylene carbonate in relatively pure form.

I have now discovered that ethylene carbonate can be recovered from admixture with ethylene glycol by procedures of extraction and azeotropic distillation which minimize heating of the ethylene carbonate.

In the drawing:

FIGURE 1 is a schematic representation of an embodiment of the invention wherein both extraction and azeotropic distillation are employed.

FIGURE 2 is a schematic representation of an embodiment of the invention wherein only azeotropic distillation is employed.

Figure 3:
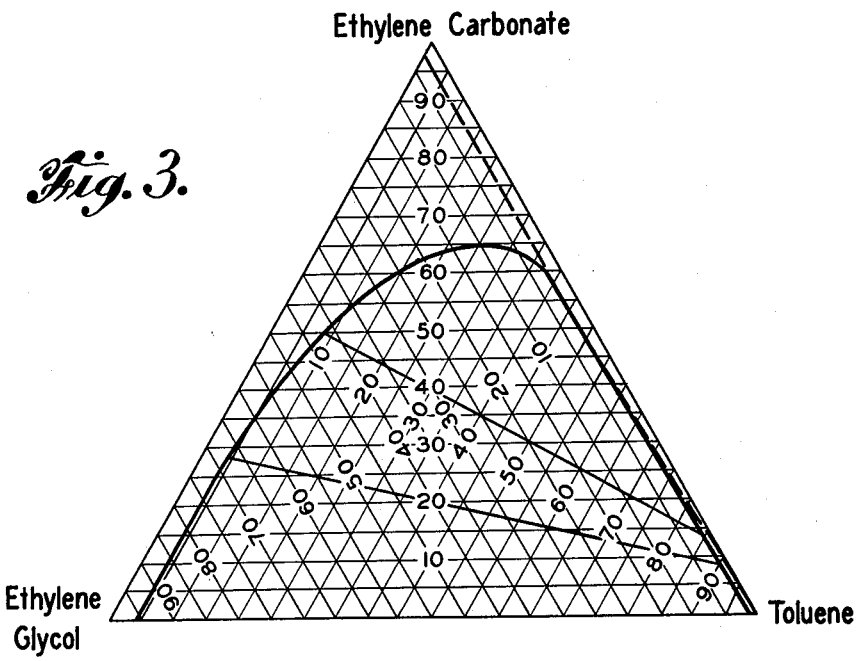
FIGURE 3 is a solubility curve at 25° C. for the three-component system consisting of ethylene carbonate, ethylene glycol and toluene.

According to the embodiment of my invention illustrated in FIGURE 2 of the drawing, wherein azeotropic distillation alone is employed, an aromatic hydrocarbon solvent is added to the mixture of ethylene carbonate and ethylene glycol and the mixture thus formed is distilled in a still with a column having a separating ability equivalent to a plurality of theoretical stages and preferably at a reduced pressure. The distillation can be conducted at a reduced pressure of from 2 to 760 millimeters of mercury. The ethylene glycol and aromatic hydrocarbon solvent form an azeotrope which is removed as distillate, leaving the ethylene carbonate as distilland to be recovered as product. The distillate, upon cooling, separates into a solvent layer and an ethylene glycol layer which are readily recovered by conventional means such as decanting. This embodiment of the invention is preferably employed where the proportion of ethylene glycol to ethylene carbonate is relatively low. The quantity of aromatic solvent added to form the azeotrope will, of course, depend on the quantity of ethylene carbonate present. The temperature of distillation should not be higher than several degrees centigrade below the boiling point of ethylene carbonate at the particular pressure employed.

When the mixture of ethylene glycol and ethylene carbonate contains a high proportion of ethylene glycol a second embodiment of my invention, illustrated in FIGURE 1 of the drawing, is preferably employed. In this embodiment the mixture of ethylene carbonate and ethylene glycol is first extracted with an aromatic hydrocarbon solvent and then the extract is distilled to remove the solvent and take out as a solvent-ethylene glycol azeotrope any traces of ethylene glycol remaining with the ethylene carbonate in the extract. The extraction is conveniently done at room temperature. The proportion of solvent employed for a particular extraction will depend to some degree on the relative proportions of ethylene glycol and ethylene carbonate in the mixture to be separated and on the particular solvent used. In general, the weight ratio of solvent to mixture being separated will be between 20 parts solvent to one part ethylene glycol-ethylene carbonate mixture and one part solvent to 20 parts mixture. As the extraction proceeds the solvent-ethylene carbonate extract is removed to leave a residue of ethylene glycol which is recovered as product. The extract is then distilled in the manner of the first embodiment of the invention described above, with the ethylene carbonate remaining as distilland to be recovered as product.

Figure 4:
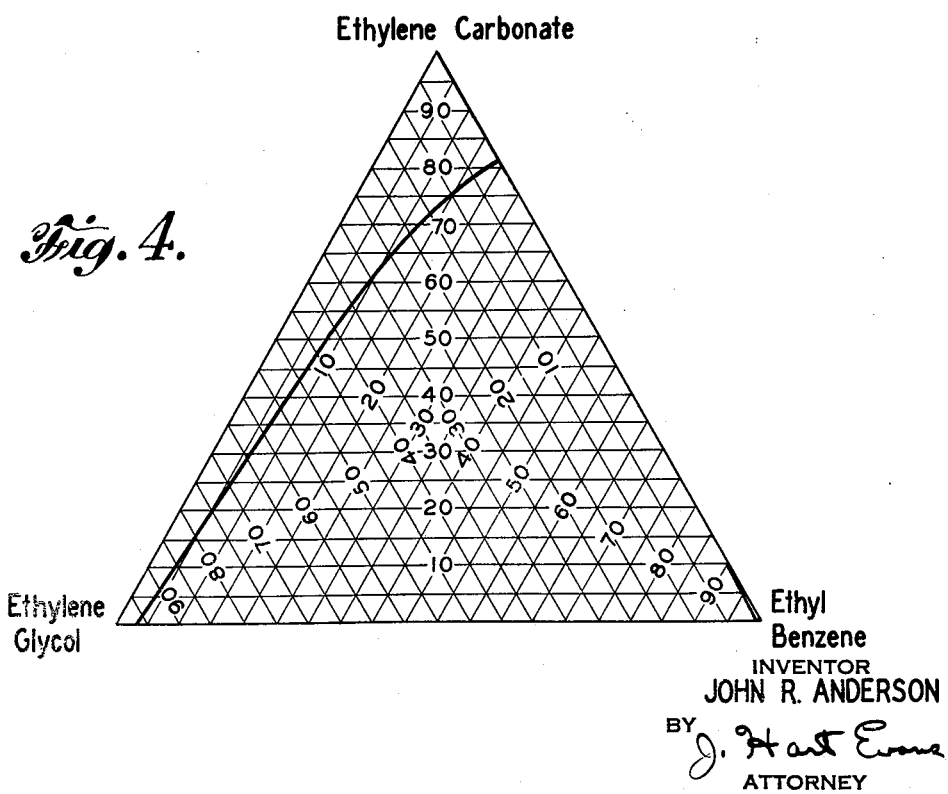
FIGURE 4 is a solubility curve at 25° C. for the three-component system consisting of ethylene carbonate, ethylene glycol and ethylbenzene.

The aromatic hydrocarbon solvent employed in the process of the invention may be any aromatic hydrocarbon, other than benzene, having a boiling temperature between 81° C. and 170° C. at atmospheric pressure. Suitable aromatic hydrocarbons include toluene, ethylbenzene, ortho-xylene, meta-xylene, para-xylene, mixed xylenes, isopropylbenzene, n-propylbenzene, mesitylene, pseudocumene and the like, or any mixture thereof. The suitability of such aromatic hydrocarbon for extracting ethylene carbonate from admixture with ethylene glycol can be seen from the examples below and from FIGURES 1 and 4 of the drawing, which figures illustrate the extraction as performed with two different preferred solvents.

By the process of the invention relatively pure ethylene carbonate can be readily obtained. The process has the further advantage that no water is brought in contact with the ethylene carbonate and ethylene carbonate is not heated above its boiling temperature, thus insuring against decomposition of the ethylene carbonate. While the invention may be operated as a batch process it is particularly adapted to continuous operation, with the attendant advantages and economies thereof. The embodiments of the invention can be described in detail with reference to the drawing.

In the drawing, FIGURE 1 is a schematic representation of one embodiment of the invention, wherein both continuous extraction and continuous azeotropic distillation are employed. The mixture of ethylene carbonate and ethylene glycol is first extracted with the aromatic solvent in extractor 11 to give an extract of aromatic solvent and ethylene carbonate and leave the ethylene glycol as residue. The extract is then distilled in the first stripping still 12 where the solvent is removed and the ethylene carbonate left as distilland.

The mixture of ethylene carbonate and ethylene glycol enters extractor 11 through feed line 13. The aromatic solvent is introduced into extractor 11 from the solvent storage tank 14 through line 15. As the extraction proceeds, the residue, comprising ethylene glycol with traces of the solvent, is removed from extractor 11 through line 16 and conveyed therein to the second stripping still 17. In the still 17 the traces of solvent are removed in the distillate through line 18 as an ethylene glycol-solvent azeotrope and the ethylene glycol remains in the still 17, from which it is removed as product through line 19.

The extract from extractor 11, comprising the solvent and ethylene carbonate, is removed from extractor 11 through line 20 and conducted therein into the first stripping still 12. As distillation proceeds in still 12 the solvent exits from still 12 as distillate, through line 21. Any ethylene glycol which has left the extractor 11 with the solvent-ethylene carbonate extract will be removed from still 12 as distillate in the form of a solvent-ethylene glycol azeotrope, being removed with the solvent through line 21. The ethylene carbonate remains in the still 12 as distilland and is removed from still 12 as product through line 22.

The solvent and solvent-ethylene glycol azeotrope in line 21 from still 12, and the solvent-ethylene glycol azeotrope in line 18 from still 17, are both led into line 23. In line 23 the mixture of the contents of lines 18 and 21 is led into the decanter 24. In the decanter 24 the mixture is separated into two layers, a top layer of solvent and a bottom layer of ethylene glycol containing traces of solvent. The bottom layer is removed from decanter 24 through line 25 and led into line 16, wherein it is conducted stripping still 17 for recovery of the ethylene glycol, in the manner described above. The top or solvent layer from the decanter 24 is removed through line 26 and recycled therein to the aromatic solvent storage tank 14 for eventual reuse in the extractor 11. Supplemental solvent from an outside source can be introduced through line 27 into line 26 and thence into the storage tank 14.

FIGURE 2 is a schematic representation of another embodiment of the invention, wherein azeotropic distillation alone is employed to effect the separation of ethylene glycol from ethylene carbonate. To the mixture of ethylene carbonate and ethylene glycol is added an aromatic hydrocarbon solvent and the resultant mixture is distilled in a still 31, the distilland comprising ethylene carbonate and the distillate an ethylene glycol-solvent azeotrope which is conducted to a decanter 32 where the solvent is separated from the ethylene glycol.

The mixture of ethylene carbonate and ethylene glycol in line 33 is joined by and mixed with solvent from line 34 and the resultant mixture is introduced into the still 31 in line 33. As distillation proceeds in still 31 the distilland of ethylene carbonate is removed from still 31 through line 35 as product. The distillate from still 31, comprising the ethylene glycol-solvent azeotrope together with any excess solvent, is removed from still 31 through line 36 and conveyed therein into the decanter 32.

In the decanter 32 the mixture separates into two layers, a top layer of solvent and a bottom layer of ethylene glycol. The ethylene glycol of the bottom layer is removed from the decanter 32 through line 37 as product. The solvent of the top layer is removed from the decanter 32 through line 34 and recycled therein to line 33 to be mixed into the feed mixture and reused in the still 31.

Supplemental solvent from an outside source can be introduced into the system through line 38.

EXAMPLE I

The experiment of this example consisted of a continuous extraction and azeotropic distillation according to the embodiment of the invention illustrated in FIGURE 1 of the drawing, employing toluene as the extractive solvent and azeotroping agent. The feed mixture to be separated consisted of 500 parts by weight of ethylene carbonate and 500 parts by weight of ethylene glycol. This mixture was fed to an extraction column together with toluene, in the ratio of 1000 parts by weight of the ethylene carbonate-ethylene glycol mixture to 2009 parts by weight of toluene. The extraction column was a "York-Scheibel" column of 2 inches inside diameter and 72 inches long.

Per 3009 parts by weight of toluene and feed mixture entering the extraction column, there was obtained 2398 parts by weight of extract and 611 parts by weight of raffinate.

The extract from the extractor, substantially all toluene and ethylene carbonate, with traces of ethylene glycol present was conducted from the extractor into a stripping still. The still was operated, with a reflux ratio of one to one, at a reduced pressure of 60 millimeters of mercury and a temperature of about 40° C. at the head of the still, until most of the toluene had been removed. The pressure was then decreased to 6 millimeters of mercury and distillation continued until the temperature at the head of the still reached 80° C. The kettle temperature reached a maximum of about 125° C. There was obtained as distilland 380 grams of ethylene carbonate of a relative purity of about 98 percent, having a freezing point of 34.7° C.

EXAMPLE II

The experiment of this example consisted of a continuous extraction and azeotropic distillation according to the embodiment of the invention illustrated in FIGURE 1 of the drawing, employing ethylbenzene as the extractive solvent and azeotroping agent. The feed mixture to be separated consisted of 500 parts by weight of ethylene carbonate and 500 parts by weight of ethylene glycol. This mixture was fed to an extraction column together with ethylbenzene in the ratio of 1000 parts by weight of the ethylene carbonate-ethylene glycol mixture to 3856 parts by weight of ethylbenzene. The extraction column was a "York-Scheibel" column of 2 inches inside diameter and 72 inches long.

Per 4856 parts by weight of ethylbenzene and feed mixture entering the extraction column, there was obtained 4281 parts by weight of extract and 575 parts by weight of raffinate. The extract, substantially all ethylbenzene and ethylene carbonate, with traces of ethylene glycol present, was then heated in a stripping still to distill the ethylbenzene and ethylbenzene-ethylene glycol azeotrope. The still was operated with a one to one reflux ratio, at a reduced pressure of 20 millimeters of mercury and with a temperature at the head of the still of 40° C., until most of the ethylbenzene had been distilled. The pressure was then decreased to 4 millimeters of mercury and the distillation was continued until the temperature at the head of the still reached 90° C. The kettle temperature reached a maximum of about 130° C. There was recovered as distilland 246 grams of ethylene carbonate which had a freezing point of 35.9° C., indicating a purity of about 99 percent.

EXAMPLE III

The experiment of this example consisted of a continuous extraction and azeotropic distillation according to the embodiment of the invention illustrated in FIGURE 1 of the drawing, employing a commercial xylene mixture of ortho-, meta-, and para-xylenes as the extractive solvent and azeotroping agent. The feed mixture to be separated consisted of 750 parts by weight of ethylene carbonate and 250 parts by weight of ethylene glycol. This mixture was fed to an extraction column together with xylene in the ratio of 1000 parts by weight of the ethylene carbonate-ethylene glycol mixture to 7474 parts by weight of xylene. The extraction column was a "York-Scheibel" column of 2 inches inside diameter and 72 inches long.

Per 8474 parts by weight of xylene and feed mixture entering the extraction column, there were obtained 7912 parts by weight of extract and 562 parts by weight of raffinate. The extract, substantially all xylene and ethylene carbonate, with traces of ethylene glycol present, was then heated in a stripping still to distill the xylene and xylene-ethylene glycol azeotrope. The still was operated, with a one to one reflux ratio, at a reduced pressure of 40 millimeters of mercury and with a temperature at the head of the still of 50° C., until most of the xylene had been distilled. The pressure was then decreased to 7 millimeters of mercury and the distillation was continued until the temperature at the head of the still reached about 107° C. The kettle temperature reached a maximum of about 135° C. There was recovered as distilland ethylene carbonate having a freezing point of 36.2° C., indicating a relative purity above 99 percent.

EXAMPLE IV

The experiment of this example consisted of a continuous azeotropic distillation according to the embodiment of the invention illustrated in FIGURE 2 of the drawing, employing a commercial xylene mixture of ortho-, meta-, and para-xylenes as the azeotroping agent. The feed mixture to be separated consisted of 90 parts by weight of ethylene carbonate and 10 parts by weight of ethylene glycol. This mixture was fed to a still together with xylene, in the ratio of 100 parts by weight of the ethylene carbonate-ethylene glycol mixture to 200 parts by weight of xylene. The still consisted of 48 inch long packed column of one inch inside diameter, having a separating ability of about 15 theoretical plates.

The still was operated at a reduced pressure of 40 millimeters of mercury and at a temperature of about 50° C. The distillate from the still consisting of xylene and a xylene-ethylene glycol azeotrope was conducted to a glass receiver which served as a decanter. The distillate separated upon cooling in the decanter and the ethylene glycol was removed as product with the xylene being recycled to the still.

The ethylene carbonate product was recovered as distilland from the still and was found to have a freezing point of 34.7° C., indicating a relative purity of about 98 percent.

What is claimed is:

1. A process for recovering ethylene carbonate from admixture with ethylene glycol which comprises adding to such a mixture an aromatic hydrocarbon solvent having a boiling temperature between 81° C. and 170° C., heating the thus formed mixture at reduced pressure, thereby distilling an azeotrope of ethylene glycol with said aromatic hydrocarbon, and recovering ethylene carbonate distilland as product.

2. A process according to claim 1 wherein said aromatic hydrocarbon solvent is toluene.

3. A process according to claim 1 wherein said aromatic hydrocarbon solvent is ethylbenzene.

4. A process according to claim 1 wherein said aromatic hydrocarbon solvent is a xylene.

5. A process according to claim 1 wherein said aromatic hydrocarbon solvent is a propylbenzene.

6. A process according to claim 1 wherein said aromatic hydrocarbon solvent is mesitylene.

7. A process according to claim 1 wherein said aromatic hydrocarbon solvent is pseudocumene.

8. A process for recovering ethylene carbonate from admixture with ethylene glycol which comprises extracting such a mixture with an aromatic hydrocarbon solvent having a boiling temperature between 81° C. and 170° C., heating the resultant extract of ethylene carbonate and traces of ethylene glycol at reduced pressure, thereby distilling an azeotrope of ethylene glycol with said aromatic hydrocarbon and recovering ethylene carbonate distilland as product.

9. A process according to claim 8 wherein said aromatic hydrocarbon solvent is toluene.

10. A process according to claim 8 wherein said aromatic hydrocarbon solvent is ethylbenzene.

11. A process according to claim 8 wherein said aromatic hydrocarbon solvent is a xylene.

12. A process according to claim 8 wherein said aromatic hydrocarbon solvent is a propylbenzene.

13. A process according to claim 8 wherein said aromatic hydrocarbon solvent is mesitylene.

14. A process according to claim 8 wherein said aromatic hydrocarbon solvent is pseudocumene.

References Cited in the file of this patent

UNITED STATES PATENTS

| | | |
|---|---|---|
| 2,664,435 | Burton | Dec. 29, 1953 |
| 2,688,645 | Badertscher et al. | Sept. 7, 1954 |

OTHER REFERENCES

L. H. Horsley, Azeotropic Data, Number Six of Advances in Chemistry Series, American Chemical Society, Washington, D.C., 1952, pages 65–67.